United States Patent [19]

Kawai et al.

[11] 4,319,721
[45] Mar. 16, 1982

[54] SAFETY BELT RETRACTOR

[75] Inventors: Takuro Kawai, Kosai; Mitsuru Kato, Toyohashi, both of Japan

[73] Assignee: Fuji Kiko Kabushiki Kaisha, Japan

[21] Appl. No.: 101,006

[22] Filed: Dec. 6, 1979

[30] Foreign Application Priority Data

Dec. 6, 1978 [JP] Japan .......................... 53-168333[U]
Oct. 18, 1979 [JP] Japan .......................... 54-144186[U]

[51] Int. Cl.³ ...................... A62B 35/02; B65H 75/48
[52] U.S. Cl. ............................................. 242/107.4 A
[58] Field of Search ................ 242/107.4 A, 107.4 R; 280/806; 297/478, 480

[56] References Cited

U.S. PATENT DOCUMENTS

| Re. 29,688 | 7/1978 | Kondziola | 242/107.4 A |
| 3,912,192 | 10/1975 | Shirley | 242/107.4 A |
| 3,930,662 | 1/1976 | Tanaka et al. | 242/107.4 A |

*Primary Examiner*—John M. Jillions
*Attorney, Agent, or Firm*—McGlew and Tuttle

[57] ABSTRACT

An improved safety-belt retractor to be applied to an automotive vehicle or other vehicles for protecting a wearer from danger caused when the vehicle is suddenly or rapidly decelerated. The disclosed safety-belt retractor comprises a frame, a belt reel rotatably disposed within the frame and a safety-belt wound thereon to allow extraction and retraction of a safety-belt, a ratchet wheel with a plurality of ratchet teeth on the periphery thereof being secured on the belt reel, a locking member movably disposed within the frame opposing to the ratchet wheel and being engageable with the teeth of the ratchet wheel, and an inertia sensing means, including a means for operating the locking member, for interengagement of the locking member and the ratchet wheel so as to lock the extraction, when the vehicle is suddenly or rapidly decelerated. The improvement comprises, in combination, an inertia sensing means supported by a supporting means in horizontally rotatable position, the supporting means includes an elastic member for allowing displacement of the locking member when the latter is moved toward the ratchet wheel and which is deflected by a top of a ratchet tooth to a position apart therefrom, and for accumulating the reaction energy for elastically forcing the locking member toward the ratchet wheel for interengagement therewith.

13 Claims, 21 Drawing Figures

SAFETY BELT RETRACTOR

BACKGROUND OF THE INVENTION

1. Field of the Invention

The present invention relates to a safety-belt retractor for an automotive vehicle or other vehicles. More particularly, the present invention relates to a locking device of the safety-belt retractor which is operative to lock the extraction or protraction of the safety-belt when the vehicle is suddenly decelerated and thereby to protect a user or wearer from crashing onto the vehicle floor.

2. Description of the Prior Art

As is well-known, there have been provided various safety-belt arrangements in automotive vehicles or other vehicles for protecting persons seated within the vehicle, and wearing the safety-belt, from danger caused by their inertia when the vehicle is suddenly decelerated. In the present specification, the change of the vehicle velocity refers generally slowing down of the velocity, wherein the inertia of the persons seated in the vehicle forces them to move frontwardly and thereby into opposed vehicular parts. While, when the vehicle velocity is suddenly accelerated, the persons are forced backwardly and thus forced against their seat. Therefore, it is unnecessary to restrain the user from backward movement against the seat.

In order to protect a person from danger of crashing onto the opposed vehicular interior, various safety-belt arrangements have been used to restrain the person in the seat, when the vehicle is suddenly decelerated. The safety-belt arrangement generally has a rotatable reel, upon which a safety-belt is wound, to allow automatic extraction and retraction of a belt. The reel is biased by a resilient member in a direction for retracting or rewinding the belt thereon. When the vehicle velocity is suddenly changed, the inertia to which the person is subjected to cause the person to move frontwardly so as to cause extraction of the belt against the force of the resilient member. Such a safety-belt device has been necessarily provided with a locking device generally comprising at least a pair of ratchet wheels and a locking element for locking the extraction of the belt so that the belt may restrain the person on the seat.

There have been provided various contructions of means for operating the locking device having the locking element. Generally, the operation means becomes operative when there is a change of vehicle velocity. In this type of the operation means, a pendulum assembly has been employed which is operative in response to inertia caused by sudden change of vehicle velocity. When the vehicle is normally driven, the pendulum assembly is in a normal position in which the vertical axis of the pendulum assembly is directed perpendicularly. When the vehicle is suddenly decelerated and vehicle velocity is thus suddenly changed, the weight element of the pendulum assembly is subjected to an inertia thereby drawing the same backwardly so as to tilt the axis of the assembly. The tilting of the pendulum assembly may cause operation of the locking device to lock the safety-belt reel so as not to extract. The pendulum assembly operates the locking device in such a manner that a top of the assembly located in a lateral position with respect to the vertical axis is tilted and thereby a portion thereof rises to push up the locking device.

During the retracting operation of the locking device, there has occasionally arisen a serious problem in that the locking device cannot be efficiently interlocked with the ratchet wheel, and thereby possibly results in extraction of the safety-belt. This has been caused by the contact of the locking element with the top of a tooth of the ratchet wheel subjecting the locking element to a reaction, and is thereby deflected or kicked off of the ratchet wheel, that may result in disengagement of the locking element and ratchet wheel.

In the prior art, there are various improved constructions of the locking mechanism to ensure the interlocking of the locking device and the ratchet wheel. In one known arrangement, there is provided a plurality of inertia sensing elements or locking elements so as to reduce the probability of accidental disengagement occurring when the vehicle is suddenly decelerated. Further, in another conventional construction, the safety-belt retractor has two interconnected locking members so that one of the members may operate to ensure engagement of the ratchet wheel and the other locking member. In such constructions, there are naturally required one more sets of ratchet wheels and locking members and an inertia sensing member which causes increased weight as well as costs and to cause difficulties in assembling.

One of the typical construction of the improved safety-belt retractor is disclosed in U.S. Pat. No. 4,090,678 issued on 23rd May, 1978 to Chusaka YAMANASHI and assigned to FUJI KIKO K.K., assignee of the present invention. In the Yamanashi patent, particularly the second embodiment with reference to FIGS. 5 and 6 thereof, there is disclosed and illustrated a safety-belt retractor having first and second ratchet wheels. The second ratchet wheel may be made of relatively soft material with respect to the first ratchet wheel, such as plastic. The second ratchet wheel has the same numbers to teeth as that of the first ratchet wheel and has a diameter slightly larger than that of the first ratchet wheel. The second ratchet wheel is rotatably secured on an axle adjacent to the first ratchet wheel in a coaxial relationship. The second ratchet wheel is engaged with a short leg portion of a substantially L-shaped locking element which has an end engaged to the first ratchet wheel. Employment of the second ratchet wheel of comparably soft material is intended to ensure engagement between the teeth of the ratchet wheel and the short leg of locking element, and thus to ensure meshing the end of locking element to the first ratchet wheel.

Another type of improved locking mechanism for safety-belt retractor has been disclosed in U.K. Pat. No. 1,356,257, granted on July 20th, 1971, to KANGOL MAGNET LIMITED. In the U.K. Pat. No. 1,356,257, there has been disclosed an inertia reel device comprising a rotatable spindle from which a vehicle safety belt can be unwound against the tension of a rewind spring, first and second ratchet wheels rotatable with the spindle, and first and second pawl member co-operable respectively with the first and second ratchet wheels, the first pawl member being movable by an inertia sensing device from a first position of disengagement from the first ratchet wheel to a second position of engagement therewith, and from the second position to a third position by rotation of the spindle in the belt unwinding direction, the second pawl member being arranged to be moved, on the movement of the first pawl member from the second to the third position thereof, from a first position of disengagement from the second ratchet wheel to a second position of engagement therewith to prevent further rotation of the spindle in the belt unwinding direction, and the first pawl member being mounted on a movable intermediate member for movement thereon between the first and second position and for movement therewith between the second and third position.

However such constructions of safety-belt retractor are expected to improve reliability for retracting operation when the vehicle has been suddenly decelerated, it will be easily understood that they require a number of additional parts which increase weight as well as costs therefor and cause assembling difficulties.

A further improved construction has been disclosed in British Pat. No. 1,466,458 to the American Safety Equipment Corporation, which is directed to an energy storing safety belt retractor comprising a vehicle inertia responsive means on the retractor for sensing changes in the inertia of the vehicle and energy storing means in force-transmitting relationship between the vehicle inertia responsive means and a lock bar for urging the lock bar toward locking engagement with the ratchet wheel. British Pat. No. 1,466,548 teaches various embodiments having vehicle inertia responsive means including elastic members for accumulating force for urging the lock bar into locking engagement with the ratchet wheel. In the illustrated constructions, if the lock bar collides with the top of the ratchet wheel, and is thereby kicked off, the force for urging the locking bar toward the ratchet wheel is accumulated in the elastic member for assurance of the interengagement between the lock bar and the ratchet wheel. However, due to the relationship between the metallic supporting plate and the actuator means including the pendulum member, noise will be generated by vehicle vibration transmitted thereto. In response to vehicle vibration, the pendulum member may move the actuator in any direction with respect to the supporting member. This causes a collision between the supporting plate and the actuator and thereby generates the noise. Further, since the actuator always contacts the supporting plate, it is subject to friction between the edge of the opening formed in the supporting plate. This will possibly cause wear of the actuator. For reducing wear of the actuator, it has been required to make the inner periphery of the opening of the supporting plate smooth enough to minimize the friction between the actuator and the supporting plate. For smoothing the inner periphery of the opening accurate processing of the surface is required which necessarily increases the cost thereof.

Additionally, in the shown construction, since the stem for connecting the actuator and the pendulum member are made of different materials from the remainder of the construction and is formed separately, the pendulum and actuator assembly will be assembled in such a manner that, at first, one of the actuator or the pendulum is secured to one end of the stem, the stem is passed through the opening of the supporting plate and then the remaining one of the pendulum member or the actuator is secured to the other end of the stem. This necessarily requires a fixing process on the both ends of the step to fixedly secure the actuator and the pendulum member. Generally, the end of the stem is clamped to fixedly secure the pendulum and the actuator to vary the length of the stem and therefore it is quite difficult to assure the constant length of stem.

The present invention is to improve the above-mentioned disadvantages or defects in the prior art and to improve a safety-belt retractor capable of reducing the manufacturing cost and simplify the assembling operation.

SUMMARY OF THE INVENTION

Therefore, it is an object of the present invention to provide a safety-belt retractor which has a simplified construction but can effectively prevent the retractor from accidental disengagement between a ratchet wheel and a locking member when the retractor is in an operative position.

Another object of the present invention is to provide a inertia sensing member which can accumulate energy for engagement of the ratchet wheel and the locking member when the locking member is accidentally deflected by the top of the ratchet wheel.

A further object of the present invention is to provide a safety-belt retractor having a pendulum member movably supported by an elastic member so as to be deformed in response to the deflection of the locking member by the top of the teeth of the ratchet wheel.

To achieve the above-mentioned objects, in accordance with the one embodiment of the present invention, there is provided an improved safety belt retractor to be applied to an automotive vehicle or other vehicles for protecting a wearer from a danger caused when the vehicle is suddenly or rapidly decelerated, the safety-belt retractor comprising a frame, a belt reel rotatably disposed within the frame and a safety-belt wound thereon to allow extraction and retraction of a safety-belt, a ratchet wheel with a plurality of teeth on the periphery thereof being secured on the belt reel, a locking member movably disposed within the frame opposing to the ratchet wheel and being engageable to the teeth of the ratchet wheel and an inertia sensing means including a means for operating the locking member for interengagement of the locking member and the ratchet wheel so as to lock the extraction, when the vehicle is suddenly or rapidly decelerated, wherein the improvement comprises, in combination, an inertia sensing means supported by a supporting means in horizontally rotatable position. The supporting means includes an elastic member for allowing displacement of the locking member when the latter is moved toward the ratchet wheel but is deflected by a top of a ratchet tooth pawl to position apart therefrom, and for accumulating the reaction energy for elastically forcing the locking member toward the ratchet wheel for interengagement therewith.

A still further object of the present invention is to provide a safety belt retractor having a means for elastically supporting the inertia sensitive means, i.e., a pendulum member. The elastic supporting member can restrict the inertia sensitive means from movement in the lateral direction with respect to the vehicle driving direction and can prevent the retractor from generating noise.

The other objects and advantages of the present invention will be understood from the description hereinafter described.

Thus, according to the present invention, since the elastic member for supporting the inertia sensitive member, such as pendulum member, is separate from the pendulum member and is secured onto the opening through which the pendulum member extends upwardly from the supporting plate, the construction of both the pendulum member and the elastic supporting member can be simply and easily manufactured. Additionally, since, as stated above, the stem portion is integrally formed with the pendulum member, it will be possible to reduce steps of manufacturing and assembling and thereby to reduce cost for manufacturing. Moreover, since the elastic member can insulate between the supporting plate and the pendulum member, both being made by rigid material, it can prevent generation of the noise which otherwise is caused by friction between the supporting plate and the pendulum member.

BRIEF DESCRIPTION OF THE DRAWINGS

The present invention will become more fully understood from the detailed description given hereinbelow, and from the accompanying drawings of the several preferred embodiments of the present invention, which, however, are not to be taken limitative of the present invetion in any way, but are for the purpose of elucidation and explanation.

In the Drawings.

DESCRIPTION OF THE PREFERRED EMBODIMENT

Referring now to the drawings, particularly to FIGS. 1 to 6, there are illustrated a safety-belt retractor in accordance with the first embodiment of the present invention. As shown in FIGS. 1 to 4, the safety-belt retractor has a frame 10 comprising aparted upper and lower planar back members 12, 14 and a pair of planar side members 16, 18 integrally extended from both ends of the back members 12, 14 at a substantially acute angle. Each of the side members 16, 18 is substantially parallel to one another so as to define generally channel-shaped configuration in plan view. On both of side members 16, 18, there are formed circular apertures 20, 22. The side member 16 has a journal 24 protruding inwardly from the aperture 20. Between both side members 16, 18, there is disposed a belt reel 26 generally comprising a hollow outer shaft 28 and a reel axle 30. The outer shaft 28 is formed with a slot 32 on the periphery thereof in parallel relationship with respect to a longitudinal axis of the shaft 28. At one end 34 of the outer shaft 28, a disk 36 having a central opening 37 is secured. While, at the other end of the shaft 28, there is secured a ratchet wheel 38 having a plurality of sawtooth shaped teeth 40 on the periphery thereof. The ratchet wheel 38 is provided a central opening 42 with a journal 44.

The reel axle 30 is disposed with the outer shaft 28, in a coaxial relationship to the latter, and is rotatable with respect to the shaft 28. At the one end, the reel axle 30 has a cylindrical head 46 with a slot 48 having an opened end 50. The head 46 has a diameter larger than that of the main portion 52 of the axle 30 so that the head 46 may be extended outwardly through the journal 24 of the side member 16 and be rotatably engaged to a journal of a spring unit described hereafter. While, at the outer end 58, the axle is integrally formed with a stepped slender axle 56 having a small diameter than that of the main portion 52. The outer end of the slender axle 56 is extended outwardly through the aperture 22 of the frame 10 and is rotatably engaged to a journal 60. Thereby, the outer shaft 28 and the reel axle 30 is cooperate to rotate together with respect to the frame 10.

Within the outer shaft 28, there is also disposed a safety-belt 62 being made of webs or woven fabrics. The safety-belt 62 at one end is turned over and sewn to the opposed portion so as to define a closed loop 66. The closed loop 66 is passed through the reel axle 30 so that it may be wound thereon in looped position. The safety-belt 62 is extended outwardly from the outer shaft 28 through the slot 32 to permit the extraction and retraction or rewinding according to the rotation of the shaft 28.

A rewinding spring unit 70 is secured on the outer surface of the side member 16 of the frame 10 by means of engagement of screws 72 passing through apertures 74 formed on a unit housing 76 to threaded aperture 78 formed on the side member 16. Further, the unit housing 76 is provided a projection 73 on the inner surface thereof. The projection 73 is engaged with an aperture 79 formed on the side member 16. Practically, the projection 73 and the aperture 79 may be not so necessary for fitting the spring unit 70 onto the frame 10, however, they will be useful for determining the location of the spring unit 70 on the frame. On fitting the unit 70, at first, the projection 73 is engaged to the aperture 79 and then the unit 70 is rotated until the apertures 74 and 78 coming into alignment. Within the housing 76, there is disposed a spiral spring (not shown) one end of which is connected to the slot 48 of the head 46 which extends into the housing 76 through the aperture 20 of the side member 16 and an aperture 77 formed on the housing 76. It should be noted that the spring unit 70 may be embodied in various constructions. However, in the preferred construction, the spring unit 70 may comprises a spring one end of which is wound onto the reel axle 30, and the other end of which is wound onto an axle 71, within the housing 70. The spring is wound onto both the axles 30 and 71 in alternative coiling direction so that the force of spring may be subject to the reel axle 30. Such a construction of the spring unit have been disclosed in Unexamined Publications of Japanese Patent Applications Ser. Nos. 51-37,415 and 53-155,442, respectively published on Mar. 9th 1976 and Oct. 7th 1978.

Below the belt reel 26, there is provided a locking lever 80 extending substantially parallel to the reel 26. Both ends 82, 84 of the lever 80 are movably engaged with generally triangular shaped openings 86, 88 formed on the side members 16, 18 of the frame 10. Each of the triangular shaped openings 86, 88 has a horizontal edge 90, 94 and a tilted edge 92, 96 so that the lever 80 may be located at the first horizontal position and at the second tilted position. In practice, the opening 86, 88 is shaped so that the locking lever 180 is with the tilted edges 92, 96, the locking lever 80 is in an alignment to tangent of the ratchet wheel so as to receive a reacting force subject to the locking lever 80. At the lateral center portion of the lever 80, there is provided a projection 98 laterally protruded downwardly from the lower surface of the lever 80, there is provided a projection 98 laterally protruded downwardly from the lower surface of the lever 80 which will be clearly shown in FIG. 6. The locking lever 80 is further provided with a tongue 81 opposite the ratchet wheel 38. The tongue 81 is engaged with the teeth of the ratchet wheel 28, when the locking device is operative in a manner described below. The tongue 81 had a tapered end which the angle thereof is adapted to the inclination of the teeth so that, when the end contacts a tooth, it may be advanced along the inclination of the tooth for interengagement therewith.

A means 100 for detecting change of the vehicle velocity is provided below the locking lever 80, while within the frame 10. The detecting means 100 generally comprises a pendulum member 102 and a supporting element 104 for supporting the pendulum member 102 so as to be rotatable in general direction. The pendulum member 102 comprises a cone-shaped head 106, mounted on the top of a shaft 108 facing the projection 98, and weight 110 secured on the lower end of the shaft 108.

The weight 110 is formed a bore 112 to receive the lower end of the shaft 108. The shaft 108 is formed with a threaded portion 114 on the lower end thereof. On the upper end of the portion 114, there is formed a flange 116 designed to abut against the end of the bore 112 and to act as a stopper. A locking nut 118 is engaged with the threaded portion 114 below the weight 110 in order to secure the latter onto the shaft 108.

However, in the preferred embodiment, the pendulum assembly is explosively assembled, is employed. The pendulum assembly can be embodied otherwise, for example, the pendulum member may be constructed integrally to have a head portion, a weight portion and an intermediate shaft portion.

Figure 1:
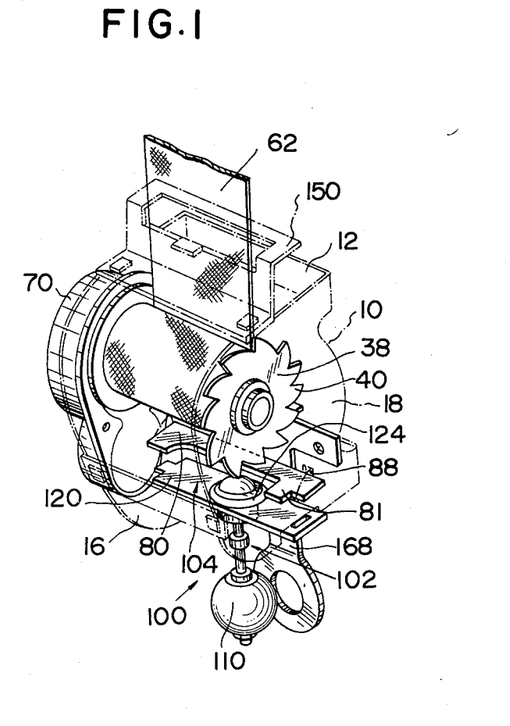
FIG. 1 is a perspective view of a safety-belt retractor in accordance with the first embodiment of the present invention, wherein a frame and a belt guide are illustrated by a dotted line for explanation.
Figure 2:
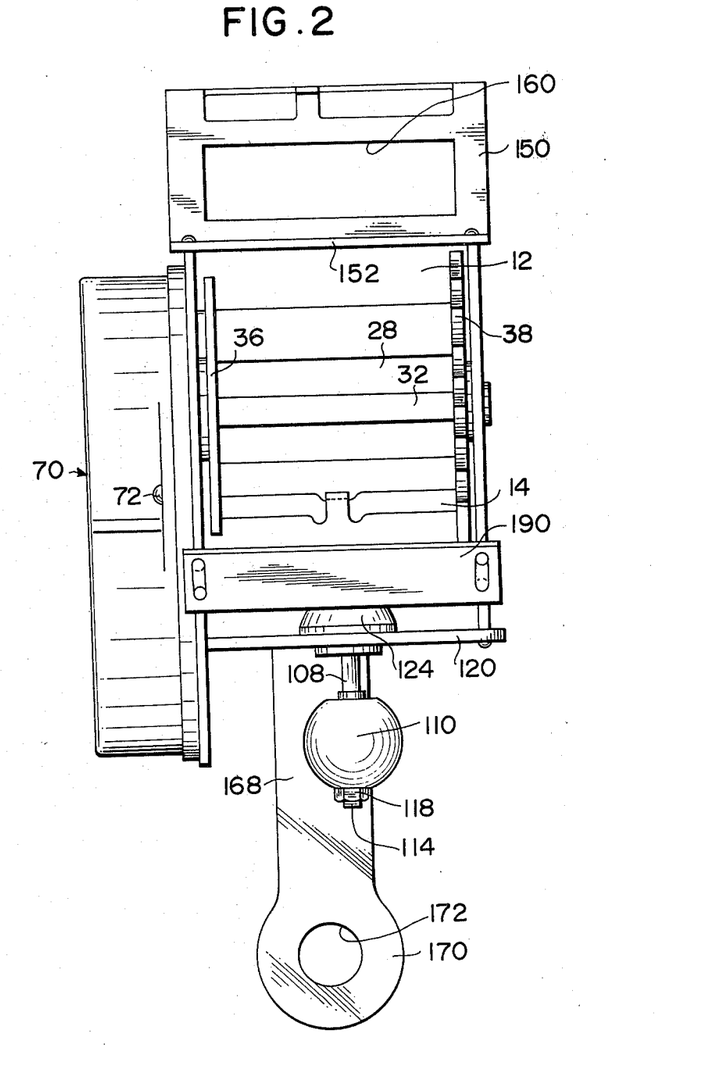
FIG. 2 is an enlarged schematic front elevational view of the safety-belt retractor of FIG. 1.
Figure 3:
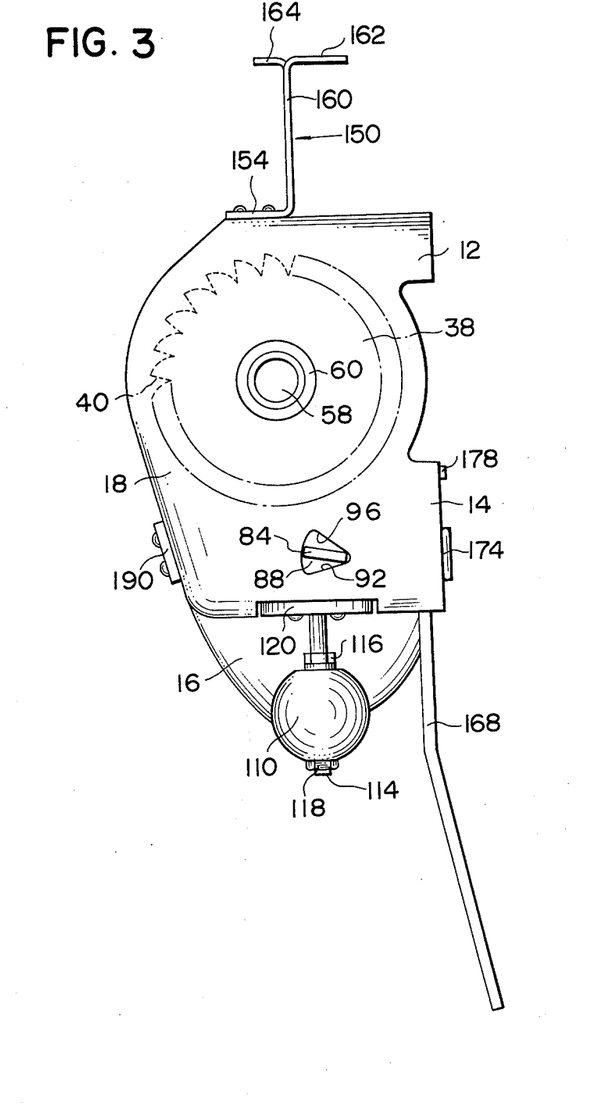
FIG. 3 is an enlarged schematic side elevational view of the safety-belt retractor of FIG. 1.
Figure 4:
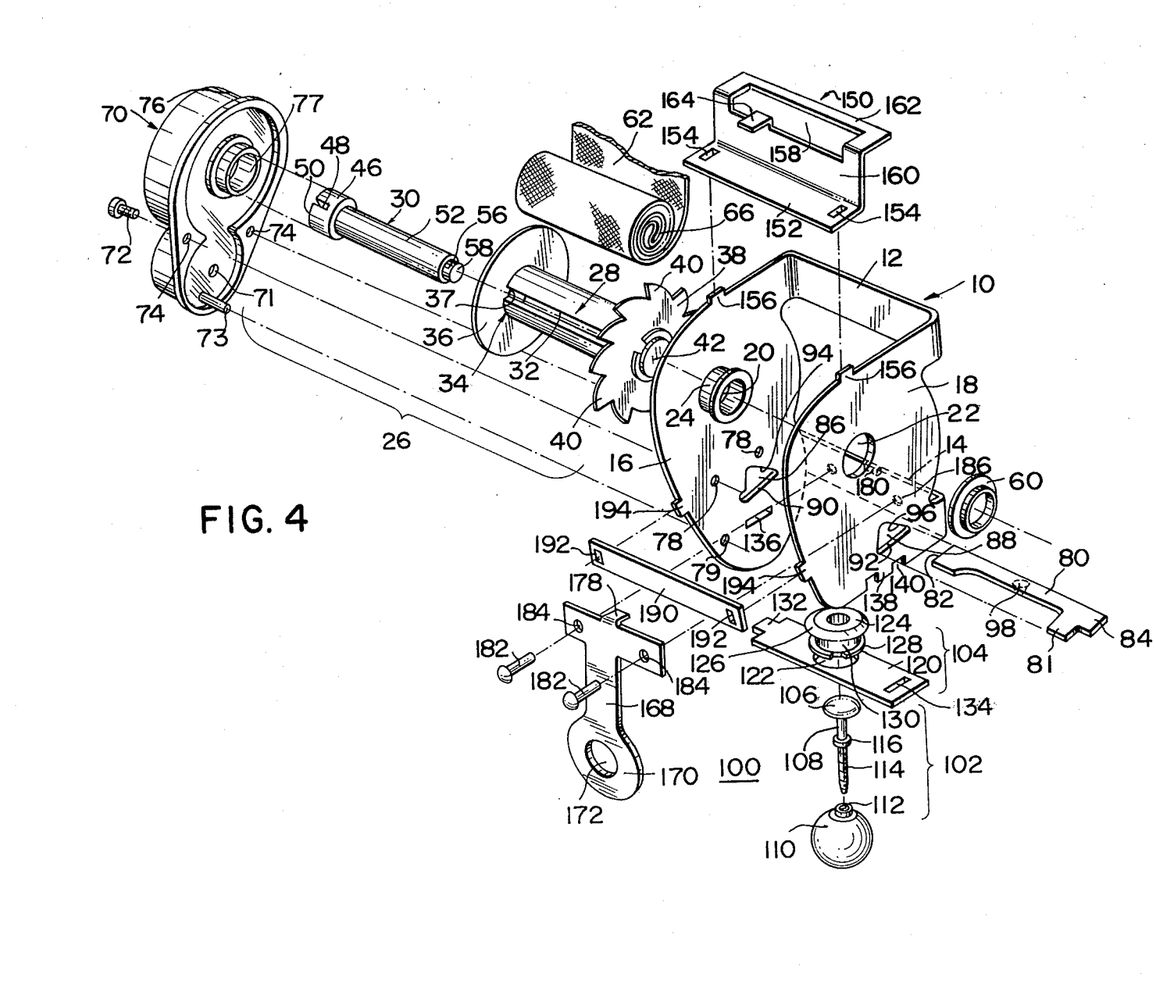
FIG. 4 is an exploded perspective view of the safety-belt retractor of FIG. 1.
Figure 5:
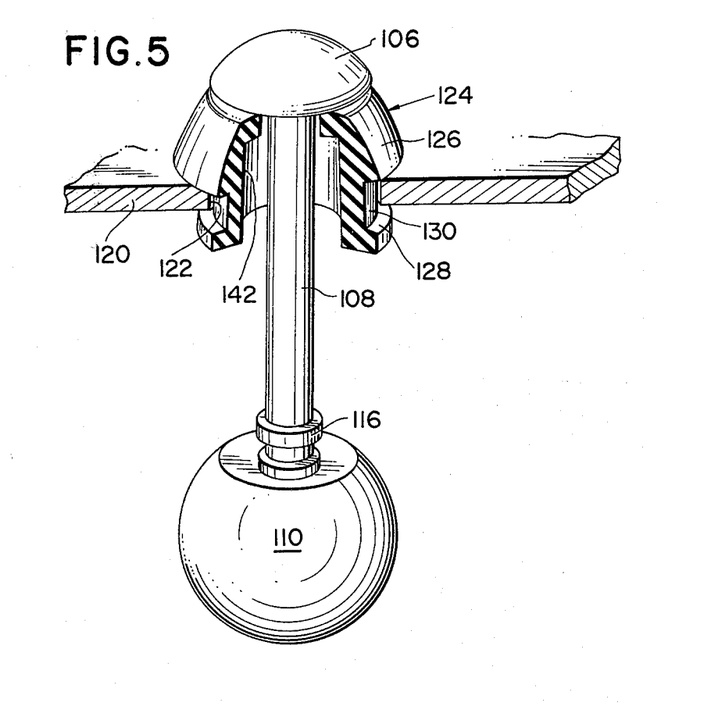
FIG. 5 is an enlarged partially sectioned perspective view of a pendulum member employed in the safety-belt retractor of FIG. 1.
Figure 6:
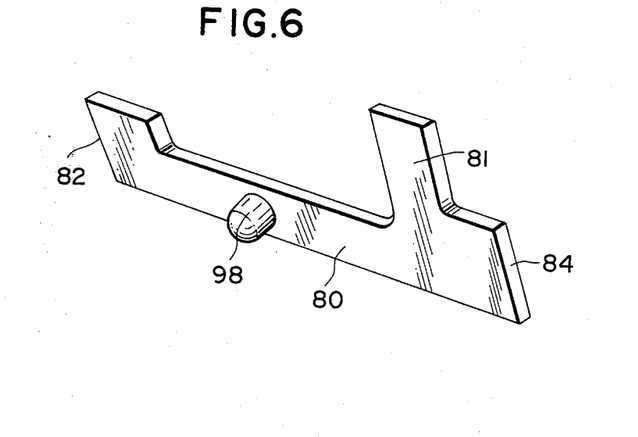
FIG. 6 is an enlarged perspective view of a locking lever employed in the safety-belt retractor of FIG. 1, in which the lever is viewed as indicated by arrow VI in FIG. 4.

While the supporting element 104 generally comprises a plate 120 having a circular opening 122 at the substantially central portion thereof and a grommet 124 engaged with the opening 122, as shown in FIG. 5. The grommet 124 has a flange portion 126, 128 whose diameter is larger than that of the opening 122 of the plate 120 and a recessed main portion 130 between the upper and lower flange portions 126, 128. The grommet 124 is made of an elastic material, such as rubber or synthetic resin having elastic characteristisc.

The supporting plate 120 has a laterally stepped narrow extension 132 at the one end thereof. While the plate 120 is formed a substantially rectangular aperture 34 at the other end. The narrow extension 132 is received in a substantially rectangular opening 136 formed on the lower portion of the side member 16. The rectangular opening 134 of the plate 120 is engaged to a tongue 138 vertically extending within a cut-out 140 which is formed on the lower edge of the side member 18.

The specific construction of the supporting member and the installation means, in the present embodiment, may be embodied otherwise. For example, the plate 120 may be provided with apertures on both side sides thereof and the extension formed on the lower ends of the both side member may be connected to the openings.

The pendulum member 102 is mounted on the supporting element 104 in such a manner that the head 106 is mounted on the upper end of the grommet 124 and the shaft 108 is received through the grommet 124 to position the weight 110 below the supporting plate 120. The grommet 124 is provided with a recess 142 on the lower portion so as not to interfere with the motion of the shaft 108 together with the weight 110.

The head 106 of the pendulum member 102 is positioned above the grommet 124 so as to be capable of tilting in the general directions in accordance with the motion of the weight 110 due to inertial moment to which the same is subjected, when the vehicle is suddenly decelerated and the vehicle velocity is suddenly changed. At the tilting position, the raised portion of the head 106 abuts against the projection 98 of the lever 80 in order to bias the lever 80 upwardly. Thus, the locking lever 180 is moved up into a range defined by the triangular-shaped openings 86, 88 of the side members 16, 18 and thus contacts the tilted edge 92, 96. The tongue 81 of the locking lever 80 is thereby engaged with a pawl 40 of the ratchet wheel 38 to lock the extraction of the safety belt.

A belt guide member 150 is disposed on the upper edge of the side member 16, 18. The lower flange portion 152 of the belt-guide 150 is provided with apertures 154 designed to receive projections 156 formed on the upper edge of the side members 16, 18. Thereby, the belt-guide 150 is secured on the upper end of the frame 10. The belt guide 150 has an opening 158 which is formed on a portion 160 and is extended to the upper flange 162. Through the opening 158, the safety-belt 62 extends outwardly from the frame 10.

The belt-guide 150 has a substantially horizontal projection 164 on the lower horizontal edge of the opening 158 so as to engage with an opening or a recess formed on a vehicle body (not shown). The projection 164 acts when it is engaged with an opening or a recess so as to keep the retractor onto the vehicle body, there is provided a substantially T-shaped bracket 168 having an enlarged lower end 170 with an aperture 172. The bracket 168 is fixedly secured on a lateral member 174 of the frame 10 by engagement of a substantially horizontal projection 178 of the bracket 168 to a recess 180 of the lateral member 174 and with rivets 182 through apertures 184, 186 respectively formed on the lateral portion of the bracket 168 and lateral member 174.

In FIGS. 1-4, a spacing bar 190 having rectangular openings 192 is provided on both side thereof so that may receive rectangular-shaped projections 194 protruded from the vertical front periphery of the side members 16, 18.

Figure 7:
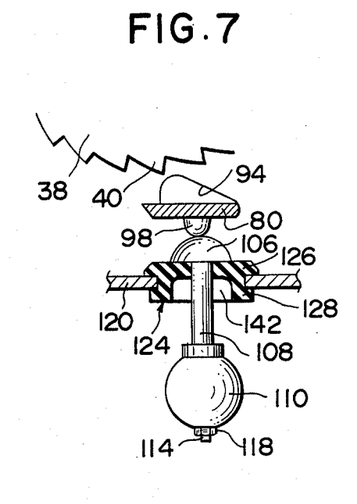
FIG. 7 is a cross-sectional view of the locking mechanism of the safety-belt retractor of FIG. 1, showing a normal inoperative position.

Now referring to FIGS. 7 to 10, there are illustrated respectively different positions in the operation of the locking device in accordance the hereinabove described embodiment of the invention. FIG. 7 shows a normal position in which the pendulum member 102 is in a normal position. The axis of the shaft 108 is then directed vertically, that is, perpendicularly in respect to the direction of the vehicle's movement. There, the head 106 of the pendulum member 102 is mounted on the grommet 124 in a vertical position and thus does not force the projection 98 of the locking lever 80 upwardly. Then, both ends 82, 84 of the locking lever 80 are located at the lower horizontal edges 90, 94 of the triangular-shaped openings 86, 88 of the side members 16, 18.

Figure 8:
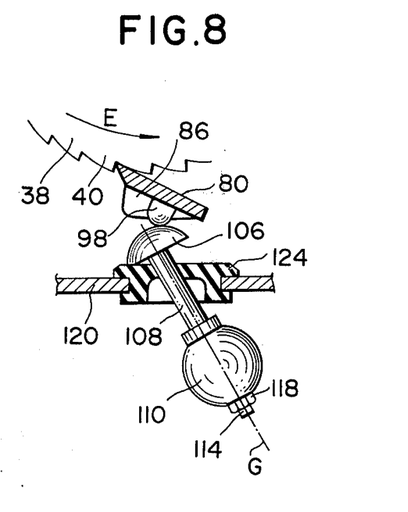
FIG. 8 is a cross-sectional view similar to FIG. 7, but showing in a locked position.

As shown in FIG. 8, when the vehicle is suddenly decelerated and then the weight cannot follow the change of velocity, an inertia subjects onto the weight 110 to draw the same backwardly. It should be noted that, in FIGS. 7 to 10, the vehicle runs in a direction from right to left. By drawn backwardly, the weight 110 is moved backwardly together with the shaft 108. Thereby, the vertical axis G of the shaft 108 is tilted within a range limited or defined by the edge of the recess 142 on the supporting member or grommet 124. Thus, the head 106 is tilted so as to be raised up to the right side portion thereof and force the locking lever 80 upwardly. The locking lever 80 moves upwardly along the triangular-shaped openings 86, 88 and finally contacts to the tilted edges 92, 94 of the openings 86, 88 to locate in a tilted position. Then, the tongue 81 of the locking lever 80 is engaged to the teeth 40 of the ratchet wheel 38 and thus locks the belt reel 26 so as to prevent rotation in the direction E whereby the belt is extracted.

Figure 9:
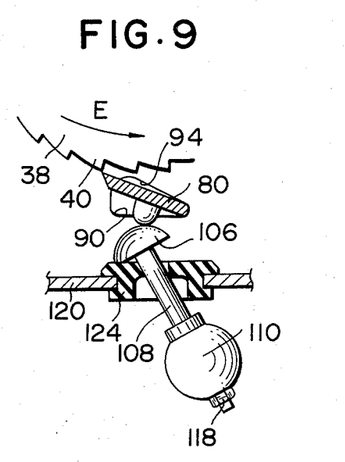
FIG. 9 is a cross-sectional view similar to FIG. 7, showing a position the locking lever being contacted to the top of a ratchet tooth of a ratchet wheel and thereby being deflected away therefrom.
Figure 10:
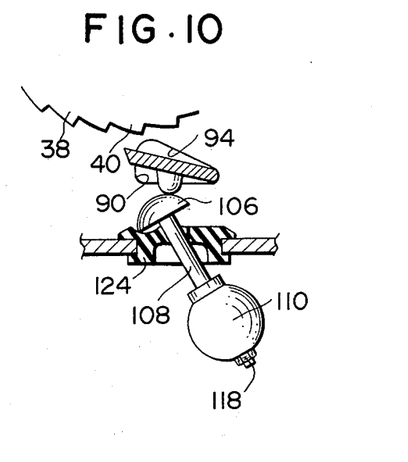
FIG. 10 is a cross-sectional view similar to FIG. 7, showing a position the locking lever being deflected and the supporting member being deformed for accumulating reaction energy.
Figure 11:
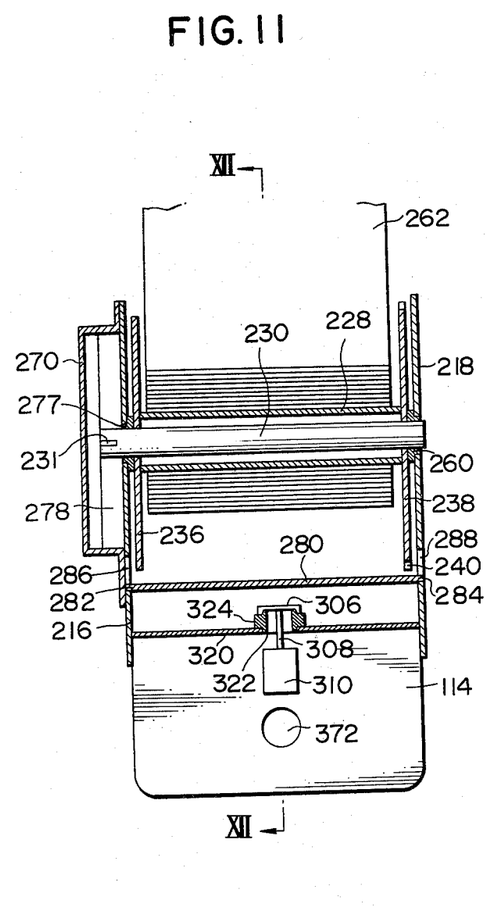
FIG. 11 is a partially sectioned front elevational view of a safety-belt retractor in accordance with the second embodiment of the present invention.
Figure 12:
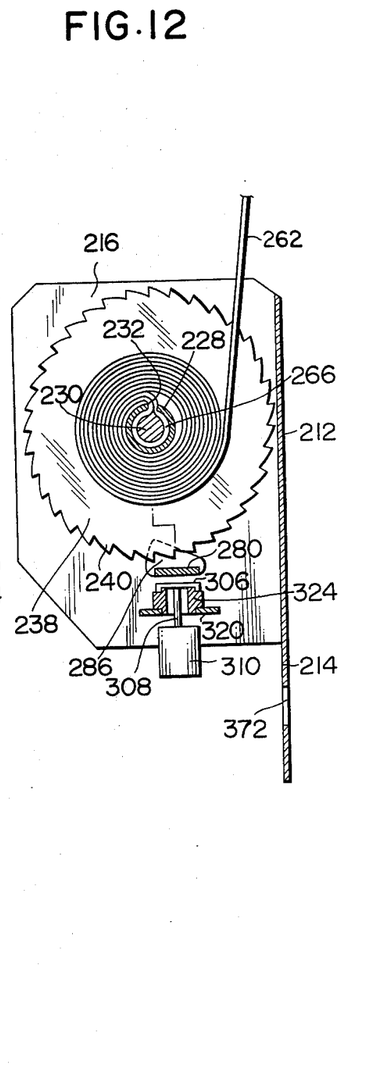
FIG. 12 is a sectional view of the safety-belt retractor taken along line XII—XII of FIG. 11.
Figure 13:
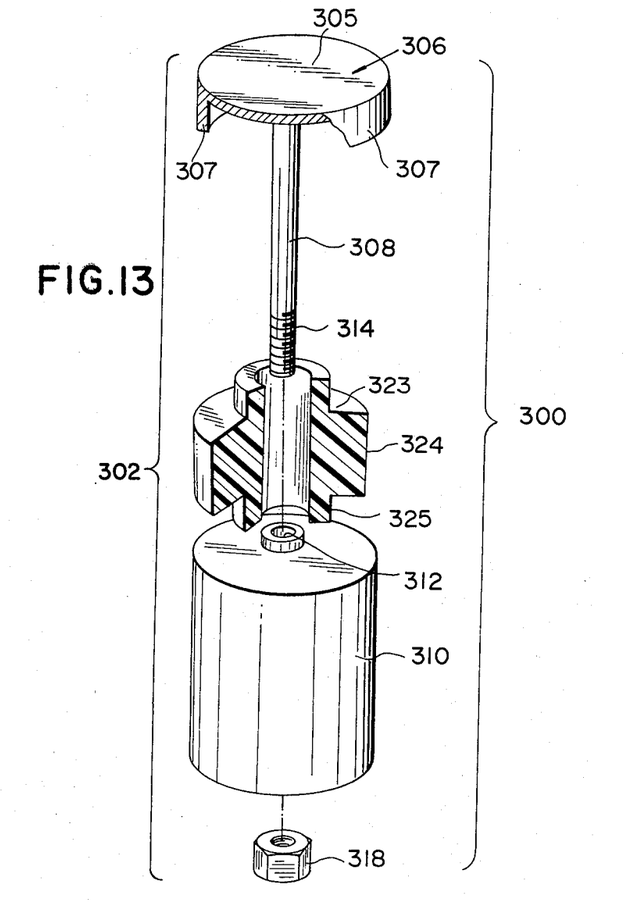
FIG. 13 is an enlarged explosive perspective view of a pendulum member applied for the safety-belt retractor of FIG. 11, showing a detailed construction in a partial section.
Figure 14:
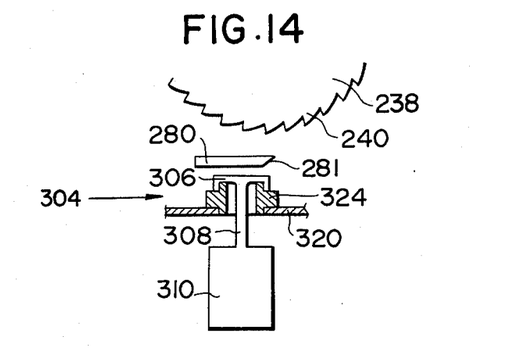
FIG. 14 is a cross-sectional view of the locking mechanism of the safety-belt retractor of FIG. 11, showing a normal inoperative position.

During the locking operation, as shown in FIG. 9, the tongue 81 of the locking lever 80 may occasionally contact to the top of a tooth 40 and be subjected to a rotational deflection force. Thereby, the tongue 81 is deflected to a position apart from the ratchet wheel 38 and the locking lever 80 is thus lowered. At this time, as shown in FIG. 10 the supporting member 124 is deformed so as to accumulate reaction energy due to the force imparted from the locking lever 80 through the head 106 of the pendulum member 102 and projection 98. By the reaction force generated by the supporting member 124, the locking lever 80 rebounds, that is, is pushed up again, to engage the tongue 81 thereof to a tooth 40 of the ratchet wheel 38.

Thereby, even if the tongue 81 contacts to the top of a tooth 40 of the ratchet 38 and is thus deflected, or so to speak, kicked off, the locking lever 80 and the tongue 81 thereof can be engaged to the next adjacent tooth 40. Thus, this embodiment assures interengagement of the tongue 81 of the locking lever 80 and a tooth 40 of the ratchet wheel 38 without providing a plurality of locking means so that it may reduce number of parts and result in cost savings.

It should be noted that a hardness of the material or element forming the supporting member 124 may be sufficient to support deform when the force imparted through the locking lever 80 through the head 106 of the pendulum member 102 exceeds a predetermined force so as to accumulate reaction energy.

Referring to FIGS. 11 to 16, there is illustrated a second embodiment of the present invention. For simplification of hereafter description and explanations, the features and elements having substantially the same constructions and the same functions to the above-explained first embodiment will be designated reference numerals two hundreds greater than that of the first embodiment wherein some of features and elements will be merely indicated in the drawings without explanation. In the second embodiment, a frame 210 has a planar back member 212 with a bracket portion 214 integrally extending downwardly from the member 212. A pair of side members 216, 218 are extended in lateral direction with respect to the back member 212 from the both ends of the member 212.

A belt reel 226 is rotatably disposed between the side members 216, 218. A belt 262 is wound on a reel axle 230. The reel axle 230 is connected to a spring unit 270 so as to be biased in a rotational direction retracting the belt 262 by a rewinding spring 278. In the second embodiment, the rewinding spring is wound on the reel axle 230. One end of the spring is engaged to the slot 231 formed on the end of axle 230 and the other end is secured on the unit housing 276.

A locking lever 280 is disposed between the pair of side member 218, 218 with ends 282, 284 movably connected to triangular-shaped openings 286, 288 of the side member 216, 218. The locking lever 280 is further provided with a tapered edge 281 along one of the lateral edge thereof. The tapered edge 281 is opposed to a ratchet wheel 283 which is secured on one end of the belt reel 226.

Opposing to the locking lever 280, there is provided a means 300 for sensing a change of vehicle velocity by way of detecting inertia. The means 300 generally comprises a pendulum member 302 and a supporting element 304. The pendulum 302 has a head 306 having a generally a disk-shaped configuration, a weight 310 and an intermediate connecting shaft portion 308. The head 306 has a planar upper surface 305 and an annular extension 307 protruded downwardly from the entire periphery of the disk portion.

The supporting element 304 for movably supporting the pendulum member 302 in general direction, comprises a supporting plate 320 having a circular opening and a generally cylindrical supporting member 324 with a recess 323 formed on the upper outer edge thereof. The supporting member 324 is made of synthetic resin such as an elastic urethane, and is mounted by way of engaging a recess 325, formed on the lower outer edge of the supporting member 324, to the opening of the supporting plate 320. The head 306 of the pendulum member 302 has a diameter of sufficiently large dimension to engage the extension to the recess 325 of the supporting member 324. The internal diameter of the supporting member 324 is sufficiently larger so that it may allow the shaft 308 of the pendulum member 302 in general direction.

Figure 15:
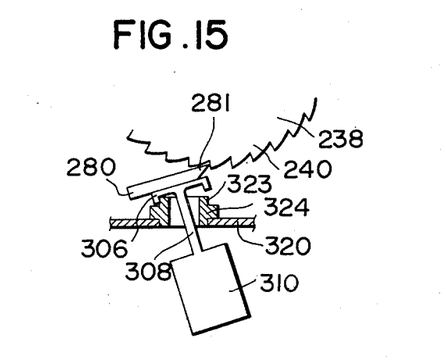
FIG. 15 is a cross-sectional view similar to FIG. 14, showing a position the locking lever being contacted to the top of a ratchet tooth of a ratchet wheel and thereby being deflected or kicked off.
Figure 16:
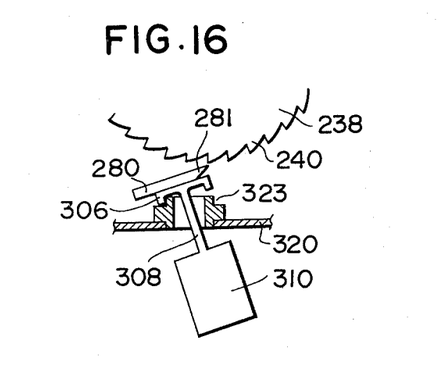
FIG. 16 is a cross-sectional view similar to FIG. 14, showing a position the locking lever being deflected or kicked off and the supporting member being deformed for accumulating reacting energy.

It will be appreciated that the locking function of the above-mentioned second embodiment is substantially the same as that of the first embodiment. However, in the second embodiment, when the supporting member 324 which is made of synthetic resin having an elasticity such as elastic urethane, is employed, it can accumulate the reaction force substantially the same as the first embodiment, as shown in FIGS. 15 and 16.

FIGS. 17 to 21 shows various alternatives or modifications of the pendulum member or supporting elements or both for embodying the present invention. It will be appreciated that, in respective embodiments, the feature and elements having the same constructions or functions or both will be designated by respectively hundred greater reference numerals than that of preceding embodiments.

Figure 17:
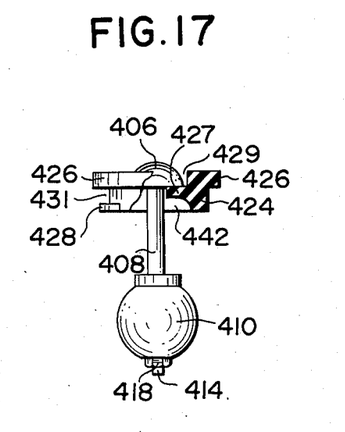
FIGS. 17 and 18 are front elevational views of locking mechanism as alternative embodiments to the first embodiment, in which the right halves are respectively sectioned for explanation.
Figure 18:
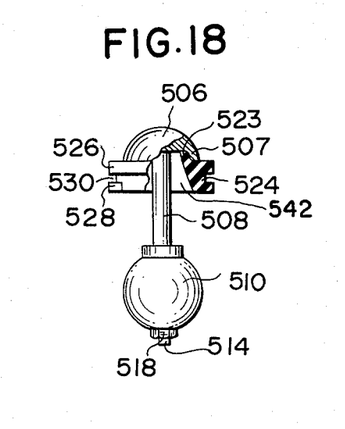

In FIGS. 17 and 18, there are shown supporting members 424 and 524 as alternative embodiments of the supporting member 124 of the first embodiment. In FIG. 17, the supporting member 424 comprises generally a cylindrical rubber having a ceiling portion 427 with a flange 426. The supporting member 424 has a circular recess 429 on the upper surface of the ceiling 427 in which a head 406 of the pendulum member 402 is received. The supporting member 424 is further provided with a plurality of spaced elongated projections 428 along the lower end of the periphery thereof.

The supporting member 424 is secured on a supporting plate 420 by engagement of the recess 431 defined between the flange portion 426 and the projective portions 428 and the internal periphery of an opening formed on the central portion of the supporting plate (not shown).

The head member 406 is mounted within the circular recess 429 and is engaged the lower surrounding surface, that is, onto the internal periphery of the recess so as to be restricted the horizontal motion with respect to the supporting member. Thereby, the pendulum member 402 is supported on the supporting member in a hung position and contacting the head to a projection protruded from the lower surface of a locking lever (not shown).

In FIG. 18, the supporting member 524 is comprises a annular rubber having a recess 530 on the vertically intermediate portion of the outer periphery thereof. The supporting member 524 is secured on a supporting plate (not shown) by engagement of the recess 530 and the periphery of an opening of the supporting plate. The supporting member 524 has a vertical annular projection 523 protruded upwardly from the entire portion of the upper edge surrounding an opening 542. While a head 506 of the pendulum member 502 is provided with an annular projection 507 protruded downwardly from the lower end of the periphery thereof. The inner diameter of the projection 507 is slightly larger than the outer diameter of the projection 523 so as to be interengageable with each other.

Thereby, the pendulum member can be restricted in the lateral motion thereof in order to prevent the head from displacing with respect to a projection formed on the lower surface of a locking lever (not shown).

In the foregoing two embodiments, the supporting member 424 and 524 function substantially the same as the supporting member 124 of the first embodiment. Thereby, these embodiments can also ensure interengagement between the ratchet wheels and the locking levers so as to lock the extraction of the belts.

Figure 19:
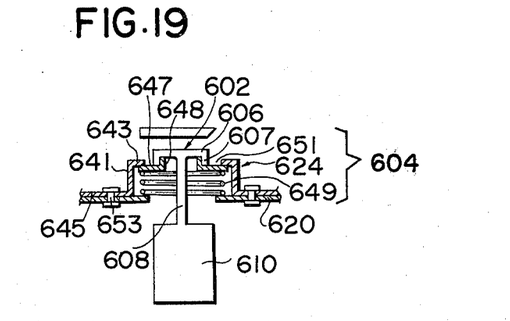
FIGS. 19 to 21 are front elevational views of locking mechanism as alternative embodiments to the first embodiment, in which the right halves are respectively sectioned for explanations.
Figure 20:
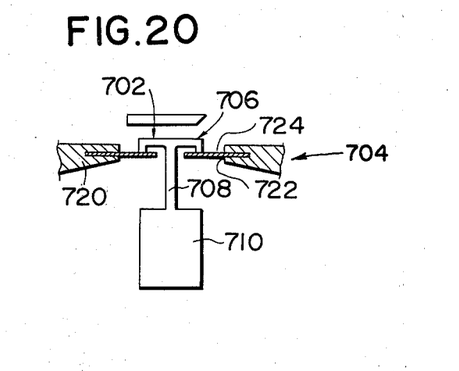
Figure 21:
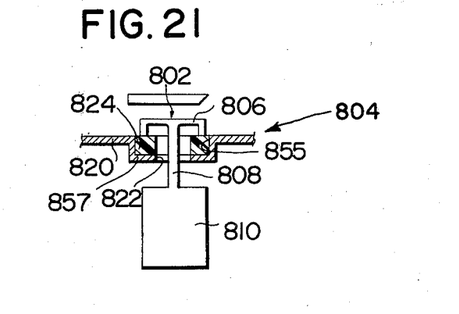

In FIGS. 19 to 21, there are illustrated and described various embodiments of supporting elements or pendulum members or both as alternatives of the foregoing second embodiment of the present invention.

In FIG. 19, there is illustrated and shown one of alternatives of the second embodiment. In this alternative embodiment, the construction of a pendulum member 602 is substantially the same as the foregoing second embodiment. A supporting element 604 generally comprises a supporting plate 620 and a resilient supporting member 624. The supporting member 624 comprises a cylindrical housing 641 having upper and lower flange portions 643, 645, an annular disk plate 647 movably disposed within the housing 641 and a helical spring 649, one end of which is secured on the lower surface of the disk plate 647. The upper flange portion 643 is protruded inwardly to define a central opening 651 of the housing 641 through which the pendulum member 602 is received. The lower flange portion 645 is laterally protruded outwardly and is fixedly secured on the supporting plate 620 by means of a plurality of rivets 653. The disk plate 647 has an upward extension 648 on the inner periphery thereof. The outer diameter of the extension 648 is slightly smaller than that of a downward extension 607 formed on the peripheral portion of the head 606 of the pendulum member 602. Thereby, both the extension 648 and 607 is interengageable so as to restrict substantially lateral movement of the pendulum member.

In FIG. 20, there is shown a second alternative embodiment of the second embodiment. Also, in this embodiment, the pendulum member 702 has substantially the same construction as that of the second embodiment. A supporting element 704 comprises a supporting plate 720 and an annular disk-shaped leaf-spring 724. The outer surrounding portion of the leaf-spring 724 is fixedly secured on the inner periphery of an opening 722 of the supporting plate 720. A head 706 of the pendulum member 702 is mounted on the spring and resilient supported thereon.

In FIG. 21, a supporting element 804 comprises a supporting plate 820 with a recess 855 and an elastic annular supporting member 824 received within the recess 855. The thickness of the supporting member 824 is substantially the same as the depth of the recess 855 to even the upper surfaces thereof. At the center of the bottom 857 of the recess 855, is formed with an opening 822 whose diameter is the same as that of the supporting member. The head 806 of the pendulum member 802 is mounted on the supporting member 824.

It will be understood that the shape or constructions of the locking mechanisms for interlocking the locking elements and ratchet wheels will be further alternated in various ways. Further, it will be expected that the feature or elements other than locking mechanism can be also alternated in various constructions or shapes, or both. For example, although in the first embodiment, the bracket 168 is formed separately from the frame 10, will be possible to made integrally such a manner as illustrated in the second embodiment. However, in the preferred construction, the bracket will be formed separately from the frame so that make the safety-belt retractor of the present invention applicable for any types of vehicles by changing only the bracket.

Thus, constructed, the present invention can fulfill all the objects and advantages sought therein.

While the present invention has been shown and described with respect to several preferred embodiments, it should not be considered as limited to these, however, or mere and simple generalizations, or other detailed embodiments. Further, alternations could be made to the form and the details of any parts or elements, without departing from the principles of the invention. Therefore, it is desired that the scope of the present invention, and the breadth of the protection sought to be granted by Letters Patent, should be defined solely by accompanying claims.

What is claimed is:

1. An improved vehicle safety-belt retractor, for protecting a wearer from danger caused when the vehicle is suddenly or rapidly decelerated, of the type having a frame, a belt reel rotatably mounted within the frame, a safety-belt wound on the belt reel, the belt reel being rotatable in a first direction to wind the belt on the reel for retraction of the belt and rotatable in a second direction to unwind the belt for extraction of the belt from the frame, a ratchet wheel with a plurality of ratchet teeth on the periphery thereof being secured on said belt reel, a locking member movably mounted within said frame adjacent to said ratchet wheel for engagement with the teeth of said ratchet wheel to thereby define a locked position in which rotation of the reel in the second direction is prevented and an inertia sensing means including means for moving the locking member for engagement of the locking member and the ratchet wheel to prevent extraction responsive to a sudden or rapid deceleration of the vehicle, the improvement, in combination, comprising a pendulum member having a substantially rigid stem extending upwardly therefrom and a head portion, supporting means for pivotally supporting the pendulum member for pivotal movement about a pivot axis, said supporting means including a supporting plate laterally positioned within the frame, said plate having an opening therein, and an elastic member mounted to said supporting plate, said elastic member having a first portion extending through said opening of said plate and a second portion overlying a part of said plate, said first portion having an opening located in alignment with said opening of said supporting plate, the pendulum member being mounted to said supporting means with said stem extending through said opening of said elastic support member and with said head portion mounted on said second portion to permit the displacement of said pendulum member in relation to said supporting plate and the accumulation of the reaction energy of the locking member in said elastic member imparted to said elastic member through the inertia sensing means when the locking member is deflected by a tooth of the ratchet wheel to a position apart therefrom for elastically forcing the locking member toward the ratchet wheel for interengagement, said elastic member having sufficient hardness to support the locking member in the locked position and sufficient elasticity to accumulate the reaction energy of the locking member upon deflection thereof from the ratchet wheel.

2. An improved vehicle safety-belt retractor, as recited in claim 1, wherein the locking member comprises a locking lever having a projection protruding downwardly from the lower surface of said lever in a location opposing the moving means of the inertia sensing means, said locking lever being movable between a locking position and an unlocking position out of engagement with said ratchet wheel.

3. An improved vehicle safety-belt retractor, as recited in claim 1 or 2, wherein said elastic member comprises a cylindrical member secured on said supporting plate.

4. An improved vehicle safety-belt retractor, as recited in claim 1 or 2, wherein said elastic member is a cylindrical synthetic member secured on said supporting plate.

5. A safety-belt retractor for an automotive vehicle comprising:
a belt winding and unwinding means with a safety-belt wound therearound, said belt winding and unwinding means being normally energized for winding said belt;
an interlocking means including first and second members, said first member being incorporated with said winding means for motion therewith and said second means being movable between a locking position and unlocking position with respect to said first member;
an inertia sensitive means responsive to an inertia applied to the vehicle for actuating said second member of the interlocking means to move said second member into the locking position, said inertia sensitive means including third, fourth and fifth members, said third member being movably hung from said fifth member through said fourth member, said fourth member having one end mounted on said fifth member opposing said second member so that said one end of said fourth member actuates said second member to the locking position when said third member is moved by the inertia applied thereto; and an elastic member being attached to said fifth member, said elastic member having a means for isolating friction between said fourth and fifth members, and said elastic member having a means for accumulating a biasing force applied to said fourth member responsive to an inertia applied thereto, and wherein said biasing force accumulating means operates to assure interlocking between said first and second members when said first and second members fail to establish interlocking condition responsive to inertia applied thereto.

6. A safety-belt retractor as recited in claim 5, wherein said elastic member is made of a non-metal material for eliminating noise generated by friction with said fourth member.

7. A safety-belt retractor as recited in claim 5 or 6, wherein said fourth member is a substantially rigid bar having a laterally extended head portion on said one end thereof, said head portion being mounted on said fifth member and said fourth member being extended downwardly from said fifth member through a hole formed in said fifth member, and said elastic member being engaged with the internal periphery of said hole and having a section placed above said fifth member and elastically mounting said head portion of said fourth member.

8. A safety-belt retractor as recited in claim 5 or 6, said third member being secured onto the other end of said fourth member, said fourth member being provided with a means for adjusting a distance between said fifth member and said third member.

9. A safety-belt retractor as recited in claim 8, wherein said fourth member is a substantially rigid bar having a threaded portion on the other end, said third member being secured onto said threaded portion and an adjusting nut means for positioning said third member with said thread portion.

10. A safety-belt retractor for an automotive vehicle comprising:

a belt winding and unwinding means with a safety-belt wound therearound, said belt winding and unwinding means including an energizing means for constantly biasing said belt winding and unwinding means to wind said safety-belt;

an interlocking means for restraining unwinding of said safety-belt from said belt winding and unwinding means in response to an inertia exceeding a predetermined value applied to the vehicle; said interlocking means including first and second members interengageably opposing one another, said first member being cooperably connected with said belt winding and unwinding means and said second member being movable between a first position where the second member is engaged with said first member for interlocking engagement with said belt winding and unwinding means and a second position where said second member is positioned away from said first member;

an inertia sensitive means responsive to the inertia and operable to move said second member from said second position to said first position, said inertia sensitive means including third, fourth and fifth members, said third member depending from said fifth member through said fourth member in a movable position about said fifth member, said fourth member comprising a substantially rigid bar-like member having a laterally extended head portion at the upper end thereof, said head portion of the fourth member being mounted on said fifth member and said fourth member being downwardly extended from said fifth member, said head portion being movably suspended thereabout together with said third member, and said third member being movable in response to inertia applied thereto to operate said second member through said fourth member to move the second member from said second position to said first position; and an elastic member having a major section interpositioned between said bar-like member of said fourth member and said fifth member, a flange section placed above said fifth member, and wherein said flange section mounts thereon said head portion of said fourth member for elastically urging said head portion of said fourth member toward said first member while said third and fourth members of said inertia sensing means are moved about said fifth member in responsive to an inertia applied thereto.

11. A safety-belt retractor as recited in claim 10, wherein said fourth member includes a height adjusting means for adjusting a dimensional relationship between said third member and said fifth member for defining said predetermined value of the inertia responsive to which said belt retractor becomes operative to restrain unwinding of said safety-belt from said belt winding and unwinding means.

12. A safety-belt retractor, as recited in claim 10 or 11, wherein said elastic member is made of a substantially flexible non-metal material so that it can act as an insulator between said fourth and fifth members to prevent the generation of a noise by friction therebetween.

13. A safety-belt retractor as recited in claim 12, wherein said fifth member includes a hole, said elastic member being engaged with said hole formed in said fifth member to arcuately position said fourth member.

* * * * *